INVENTOR
HELLMUT MÜLLER

Feb. 2, 1971  H. MÜLLER  3,559,509
MOVEMENT BRAKING MEANS FOR A DEVICE OPERATING ON WORKPIECES
Filed March 18, 1968  4 Sheets-Sheet 3

INVENTOR
HELLMUT MÜLLER
BY Jennings Bailey Jr.
ATTORNEY

United States Patent Office 3,559,509
Patented Feb. 2, 1971

3,559,509
MOVEMENT BRAKING MEANS FOR A DEVICE OPERATING ON WORKPIECES
Hellmut Müller, 731 Esslinger Strasse 91,
Plochingen (Neckar), Germany
Filed Mar. 18, 1968, Ser. No. 713,909
Claims priority, application Germany, Sept. 15, 1967,
M 75,551
Int. Cl. B23b 39/00
U.S. Cl. 77—1
9 Claims

ABSTRACT OF THE DISCLOSURE

A tool is mounted on a frame for movement with respect to a workpiece cleared by the frame along axes perpendicular to each other. The frame carries thin plates which extend between a cylinder part of the tool carrier and a clamping member connected to a piston slidable in the cylinder part. Spring means act in one direction on the piston while a pressure fluid acts in the other direction. The clamp part is formed of spring band steel.

Means are provided to cause movement of the piston to clamp the band steel part when the tool reaches its desired working position.

BACKGROUND OF THE INVENTION (1) Field of the invention

The invention is concerned with a device for operating on workpieces, for example, by boring, punching, chemically taking off or away the upper most layers of material etc. More particularly, the invention is concerned with a device of the beforementioned kind which is equipped with a work support, for example, a work table, and a tool carrier, whereby the said table and the said tool carrier are displaceable along at least one coordinate axis.

(2) The prior art

With arrangements of that kind, the movable parts or members, tables or the like are braked by elements which are applied, as a rule, in the rearmost region in the area of the driving aggregate. It has shown that with such arrangements the moved parts, for example, the boring head, a slide etc., because of the nature of the drive can be braked only by being exposed to relatively great vibrations originating in the non-rigid, resilient connecting members, such as toothed belts, shafts, threaded spindles, chains, clutches, transmissions etc. Besides, with all the known arrangements of this kind there must necessarily be provided special clamping devices so that the construction is complicated and expensive.

SUMMARY OF THE INVENTION

The object of the present invention is to provide a device of the kind in question here that requires minimal time intervals for determining the exact position and offers a maximal exactitude.

Another object of the invention consists in providing a device of the general character described with which the part to be moved (slide, boringhead, work table etc.) can be braked by means of a braking device directly and without the interposition of any transmitting members, such as shafts, threaded spindles, chains etc. onto the rigid part (upper plate, or carrier plate, bed, slide etc.) whereby the kinetic energy is absorbed and destroyed.

Yet another object of the invention consists in providing a device of the general character described with which a decisive simplification of the construction and in consequence thereof a remarkable reduction of the costs is obtained due to the fact that it is no longer necessary to take into consideration the stability of the driving aggregate or of the driving elements.

A further object of the invention consists in providing a device of the kind here in question which makes it possible with one and the same device to brake on the one hand the moving part during the adjusting motion and to clamp and fix the said part on the other hand after it has reached its desired or its final position.

A still further object of the invention consists in providing a device of the above said type which contains a smaller number of elements so that, consequently, less disturbances may arise.

Another object of the invention consists in providing a device of the above described character with which it is possible to have the displacing power so small that the moved parts can be started over and over from the complete or approximate standstill which means, in addition, that each start is made under the same conditions, a fact that makes it possible to control and survey the motion of the moving part or member through the whole operation much better than is the case with the comparable arrangements of known type.

Yet another object of the invention consists in providing a device of the type here in question with which instead of the usual plurality of speeds there can be used two speeds only: a rapid motion and a slow one, without diminishing the exactitutde in determining the position chosen in any way.

These and other objects, features, and advantages of the present invention will become further apparent from the following detailed description thereof.

BRIEF DESCRIPTION OF THE DRAWINGS

Several embodiments of the invention are illustrated, by way of example, in the drawings in which.

DESCRIPTION OF THE PREFERRED EMBODIMENTS

Figure 1:
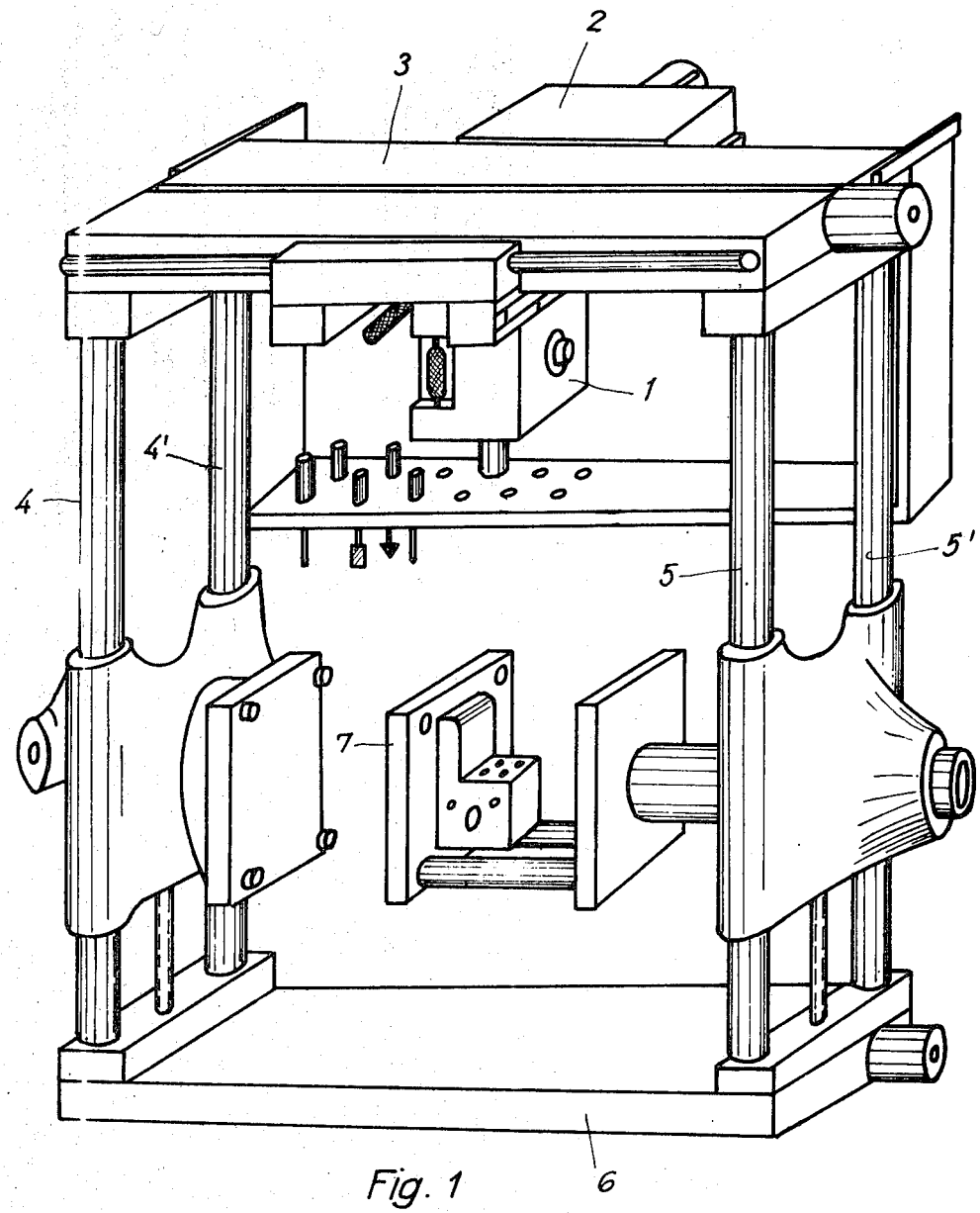
FIG. 1 is a perspective view of an arrangement according to the invention serving to illustrate the manner of operation of the invention.

The embodiment shown in FIG. 1 of the drawing has tool carrier 1 which is constructed, for example, as a boring head and which is guided by means of a compound slide 2 on a horizontal or approximately horizontal rail- or plate-like supporting element, which, for instance, may be constructed as a bipartite upper or carrier plate and which is carried by column-like elements 4, 4', 5, 5' upstanding from the base plate 6. These column- or post-like elements 4, 4', 5, 5' carry the work support 7, for instance by means of a slide or slides and/or a reversible clamping device. The arrangement is such that the tool carrier is displaceably guided along the suporting element 3 in two directions rectangular to each other so as to be movable to and fro; in its working position it bears with its side turned away from the work support 7, or the workpieces arranged thereon against the upper or carrier plate. For that purpose the tool carrier 1 is guided on the underside of the compound slide 2 so as to be displaceable therealong to and fro in its longitudinal direction (Y-axis of the system of coordinates), whereas the compound slide 2 is guided on the underside of the supporting element 3 so as to be displaceable to and fro in its longitudinal direction (X-axis of the system of coordinates). To produce the said displacing motions there are allotted to the compound slide as well as to the tool carrier separate driving devices of some kind, for example, in the form of a threaded spindle, a toothed belt etc., whereby the said driving device is drivingly connected with a separate torque producing device, a hydraulic or electric motor for instance. The device according to the invention is, therefore, a device provided with a tool carrier, a boring head for instance, and with a support for work pieces, a table for instance, wherein by means of a driving aggregate both parts can be displaced together or alone along one or more coordinate axes. To each of the driving aggregates there is then allotted a braking device directly engaging the part to be moved and which serves to brake the moved parts or to absorb or destroy their kinetic energy. This braking device is provided on the member to be moved and upon actuation presses the said member to be moved against that part of the machine which serves to guide it, against the slide, for instance.

Figure 2:
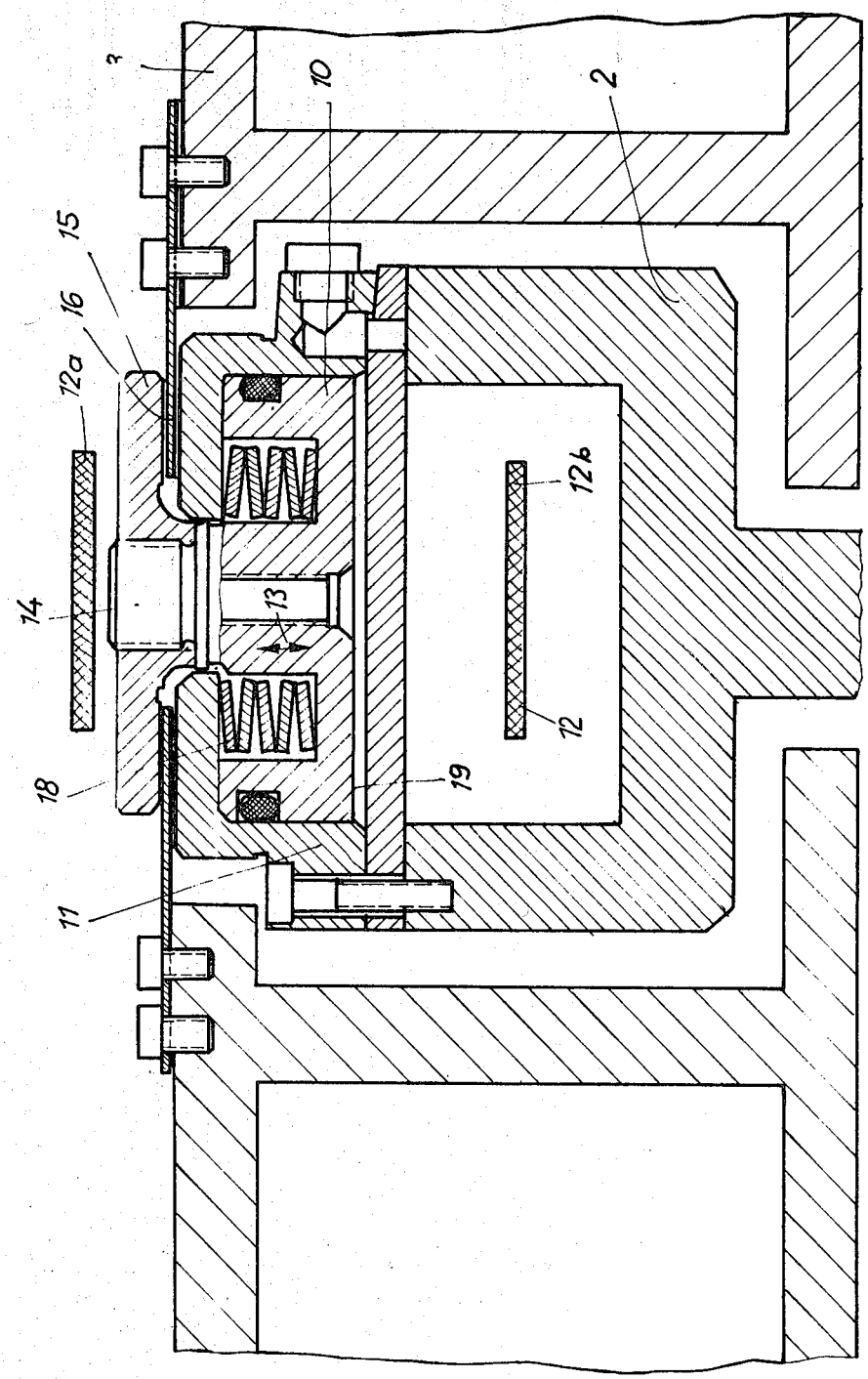
FIG. 2 is a vertical sectional side view of a detail of the arrangement according to FIG. 1.

As can be taken, for instance, from FIG. 2 (in which there is shown the braking device serving to brake the movement along the X-axis of the compound slide on the carrier or upper plate) the braking device consists of a braking piston 10 guided within a braking cylinder 11 which is rigidly connected with the member 2 to be moved by the toothed belt 12. The brake piston is influenced on the one hand by springs and on the other hand by a hydraulic or pneumatic medium acting in a direction opposite to the said springs; the movement of the piston according to the arrow 13 is transverse to the direction of the member to be moved. The piston is connected by the screw 14 with the braking member 15 standing out or projecting from the braking cylinder and which has the shape of a plate which in the effective braking position is pressed by springs from above against the contact member 16, which is plate-shaped and is rigidly and solidly connected with the fixed part 3. The arrangement is such that in the effective position the contact or abutment member 16 is clamped between the brake piston or the plate 15 representing the braking member on the one hand and the side of the braking cylinder facing it on the other hand. The braking and abutment surfaces of the braking piston and the braking cylinder are hardened, however, they may also be coated with a material applied thereto by some electro-chemical method, or by spraying or gluing operations, for example, with synthetics or metals, molybdenum for instance. The spring force acting on the braking piston is exerted by a set of Belleville spring washers 18 which conveniently is received by the braking cylinder and which exerts a power that has the tendency to press the plate 15 against the contact or abutment member 16, whereas the hydraulic or pneumatic medium which can be introduced into the space 19 has the tendency to separate the plate 15 from the abutment surface it is in touch with. The abutment surfaces of the contact or abutment member can be plates made of spring band steel. This has the advantage that plates of that type are especially stiff and rigid along a single axis, namely the braking axis, whereas along the other axes they have a certain flexibility that may be desirable. The spring band steel is moreover low in price and has that high strength and extreme hardness which are necessary. The above described braking device can be applied in the same way for braking the tool carrier on the compound slide. With such an arrangement it is also possible to regulate the braking effect to the braking device that is to make provision that this effect can be adjusted by increasing or decreasing the hydraulic or pneumatic pressure during the braking process.

Figure 2A:
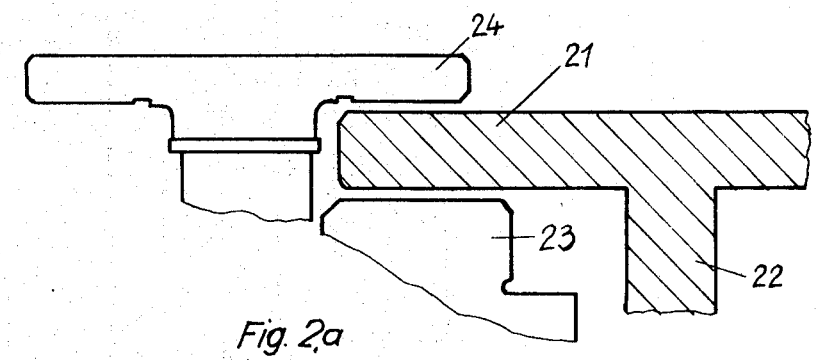
FIG. 2a is a vertical sectional side view of a detail of a modified form of the invention.
Figure 3:
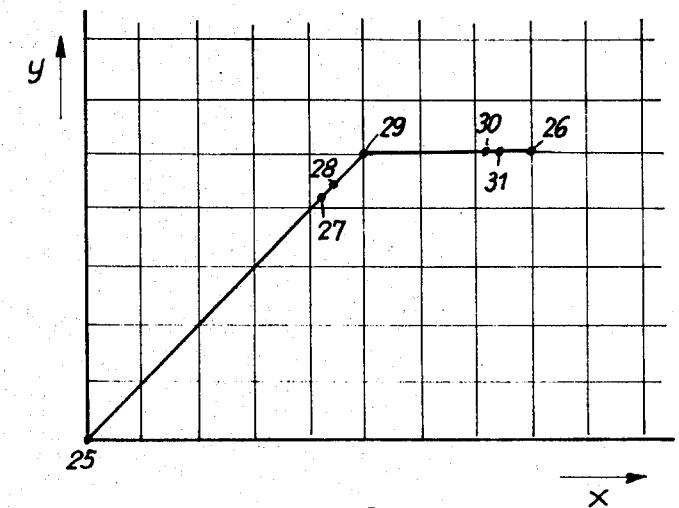
FIG. 3 is a diagram demonstrating the manner of operation of the device according to the invention.

The braking device according to FIG. 2 can be provided for movements along the X-axis as well as for movements along the Y-axis or for movements along other axes. In FIG. 3 there is shown one of the methods for approaching a certain position with the device according to the invention. Assuming that, that starting from point 25, it is desired to reach point 26, the distance of which from the starting point 25 along the X-axis is greater than that along the Y-axis. As a rule, a movement is performed at the same time and at a constant rate along both axes, that is, a movement is performed along a line that makes with these axes an angle of 45° until reaching the point 27. Upon reaching the point 27, the drive for movement along the Y-axis is stopped, whereupon the braking device is made to be effective until the moved part is stopped or stands still absolutely or approximately at point 28. As soon as the moved part has reached this position on the Y-axis, the slow motion drive is brought into action, (whereby with the present invention under certain circumstances it is no longer necessary to provide the so-called pre-slow motion speed and further speeds). Upon reaching the end position along the Y-axis at point 29, the braking device is actuated to clamp and fix the said part to be moved on the Y-axis and to hold the said part fixed in its position. Meanwhile the part to be moved is moving further on along the X-axis until it reaches the point 30, whereupon the above described proceedings along the Y-axis are repeated with respect to the X-axis: disconnection of the driving aggregate at point 30 and braking of the slide until point 31 is reached, then slow motion until reaching point 26. At point 26 the X-axis, too, is definitively clamped and fixed and the motion along this axis is stopped. The desired position 26 is reached. As for the distances between the points 27 and 29, and between the points 30 and 26 in FIG. 3, these have been shown in the drawings as large distances on purpose; in practice they are a matter of fractions of millimeters only. With the arrangement according to FIG. 2 the plates 16 made of spring band steel are attached to the upper plate or carrier plate 3. These plates constitute the abutment member of the braking device. However, this abutment member of the braking device and the upper plate or carrier plate may constitute also one piece only or may be integral with one another, as is to be seen in FIG. 2a. In this FIG. 2a the abutment member 21 and the upper or carrier plate 22 are connected and united to form a single piece. 23 indicates the braking cylinder, 24 is the plate which is connected with the braking piston. The embodiment shown in FIG. 2 has a compound slide that is driven by means of a belt 12, the ends of which are indicated at 12a (upper end) and 12b (lower end). However, there can be used also a drive with spindles or other driving elements for the parts to be moved.

Figure 4:
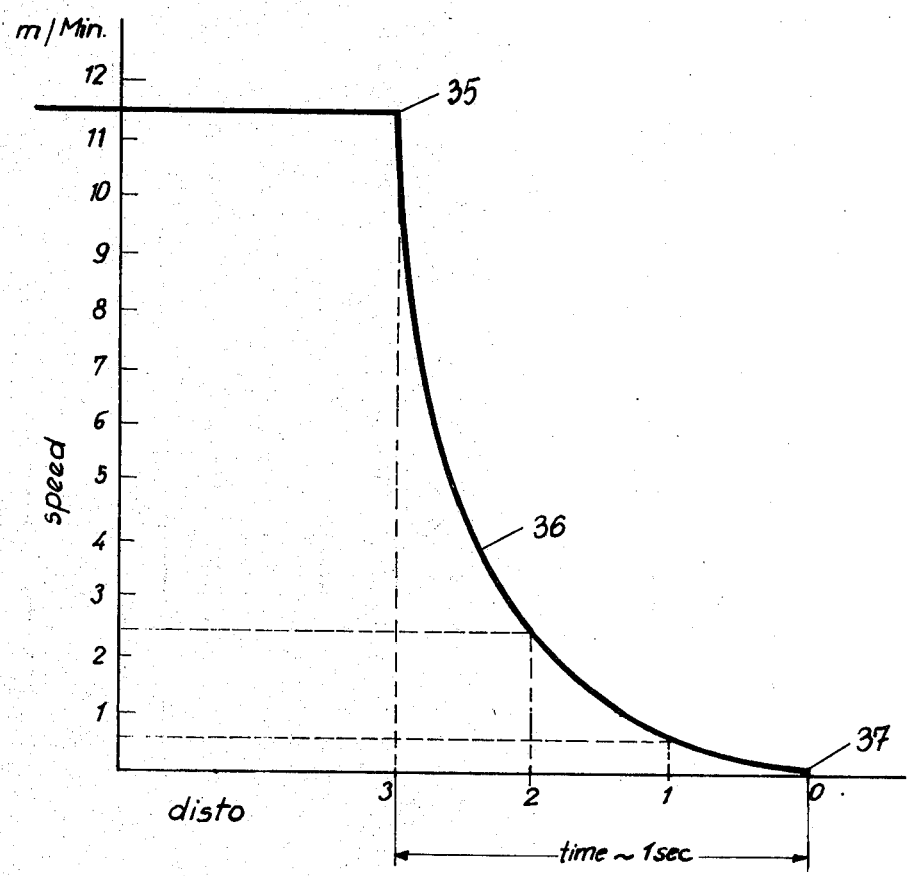
FIG. 4 is a diagram demonstrating the manner of operation of another embodiment of the device according to the invention.
Figure 5:
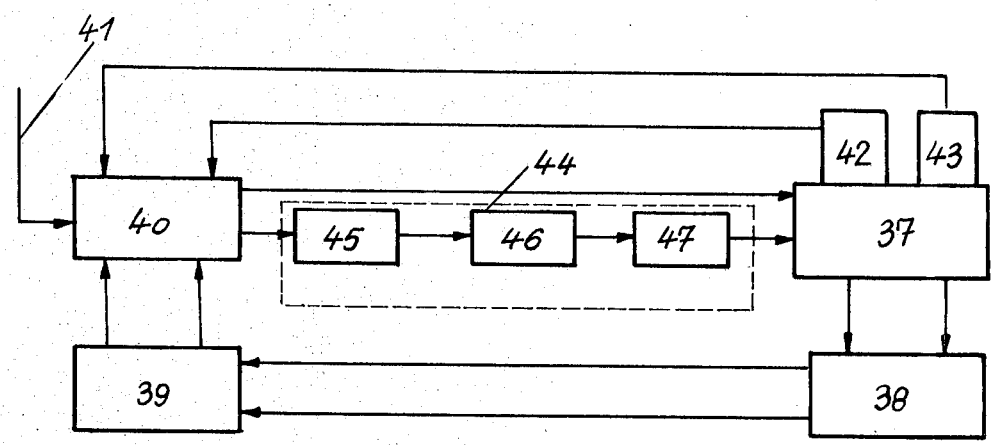
FIG. 5 is a wiring diagram serving to illustrate the manner of operation of a device according to FIG. 5 operating as shown schematically in FIG. 4.

It is also possible to adjust according to FIG. 4 the braking effect of the braking device during the braking operation. In FIG. 4 there is shown, for example, a diagram according to which at point 35 the speed of the slide is slowed down at the end of the rapid traverse along the curve 36 until reaching point 37, and then the slide is completely stopped. This method brings about a considerable saving of time, since by this method the slide requires for moving from point 35 to point 37 a time of about 1 sec., whereas with other methods the time required is 4–5 sec. or more. In FIG. 5 there is represented a diagram showing how the braking effect according to FIG. 4 is performed. In this figure, 38 is the machine tool to be controlled, 38 is the electronic measuring system, 39 is the computing aggregate, and 40 is the numerical control device to which the program is applied through 41. 42 is the position controlling and measuring appliance, 43 is the rate controlling and measuring appliance. At 44 there is designated generally the position director appliance containing the amplifier 45, the servo-valve 46 and the hydraulic brake 47.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A device for operating on workpieces comprising, in combination, a work support part, a tool carrier part, at least one driving aggregate with higher and lower driving speeds operatively connected to at least one of said parts, one of said parts being displaceable with respect to the other part by said driving aggregate in the direction of at least one coordinate axis, a braking device operatively connected to the moving one of said parts, said braking device including means carried by one of the parts and engaging the other part for braking momentarily the movement of the moving part with respect to the non-moving part, its kinetic energy being thereby absorbed and destroyed, said braking means being adjustable, the braking device being rendered effective during movement of the moving part at higher speed as soon as the point for the disconnection of the drawing aggregate is reached and remaining active after the disconnection of the coordinated driving aggregate until the said moved part comes at least approximately to a standstill, said braking device becoming then inactive and said moving part being moved by the driving aggregate at the lower speed and said braking device being actuated to brake the movement of the moving part when it reaches its end position.

2. The device set forth in claim 1, wherein the said braking means includes clamping means, whereby it serves on the one hand upon actuation to bring the moving part to a standstill at a certain predetermined moment, and on the other hand to fix and hold the said part in its position upon having reached such position.

3. The device set forth in claim 2, wherein the stationary part includes guiding means for the moving part and the said braking device comprises a braking member provided on the said part to be moved, the said braking member upon actuation pressing the said movable part against the guide means.

4. The device set forth in claim 1, wherein the said braking means is constituted by a braking piston guided within a braking cylinder, which is exposed on the one hand to the effect of a spring and on the other hand is influenced by a hydraulic medium working in opposite direction, said braking piston being connected with a braking member projecting out of the braking cylinder, an abutment member fixedly connected with the other part being clamped in the effective position of the said braking member between this braking member and the side of the said braking cylinder facing it.

5. The device set forth in claim 4, wherein the abutment member is plate-like and the said braking member connected with the said braking piston has the form of a plate which in the effective position presses against the abutment member.

6. The device set forth in claim 4, wherein the spring force influencing the braking piston is exerted by a set of Belleville spring washers accommodated within the braking cylinder.

7. The device set forth in claim 4 wherein the said braking piston is exposed on the one hand to the influence of a fluid medium tending to remove it from the said abutment member and on the other hand to the influence of a spring tending to press it against the said abutment member.

8. The device set forth in claim 4, wherein the said braking piston is exposed on the one hand to the influence of a fluid medium tending to press it against the said abutment member and on the other hand to the influence of a spring tending to remove it from the said abutment member.

9. The device set forth in claim 4, wherein the said abutment member comprises a plate of spring band steel.

References Cited

UNITED STATES PATENTS

| | | | |
|---|---|---|---|
| 1,776,765 | 9/1930 | Ferris | 188—170 |
| 2,625,843 | 1/1953 | Arp | 29—1.5 |
| 3,106,110 | 10/1963 | Senn | 29—1.5 |
| 3,263,778 | 8/1966 | Pfeiffer | 188—170 |
| 3,297,115 | 1/1967 | Waloen et al. | 188—170 |

FOREIGN PATENTS

| | | | |
|---|---|---|---|
| 1,361,471 | 4/1964 | France | 188—170 |
| 1,473,540 | 2/1967 | France | 188—170 |

GERALD A. DOST, Primary Examiner

U.S. Cl. X.R.

188—170